United States Patent
Braun et al.

(10) Patent No.: US 12,275,145 B2
(45) Date of Patent: Apr. 15, 2025

(54) METHOD AND APPARATUS FOR HUMAN AUGMENTATION AND ROBOT ACTUATION

(71) Applicant: VANDERBILT UNIVERSITY, Nashville, TN (US)

(72) Inventors: David Braun, Nashville, TN (US); Chase W. Mathews, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 255 days.

(21) Appl. No.: 17/872,164

(22) Filed: Jul. 25, 2022

(65) Prior Publication Data

US 2023/0036736 A1 Feb. 2, 2023

Related U.S. Application Data

(60) Provisional application No. 63/225,156, filed on Jul. 23, 2021.

(51) Int. Cl.
| | |
|---|---|
| *B25J 9/10* | (2006.01) |
| *B25J 9/00* | (2006.01) |
| *B25J 9/12* | (2006.01) |
| *B25J 19/00* | (2006.01) |
| *B33Y 80/00* | (2015.01) |

(52) U.S. Cl.
CPC ............. *B25J 9/126* (2013.01); *B25J 9/0006* (2013.01); *B25J 9/106* (2013.01); *B25J 19/0016* (2013.01); *B33Y 80/00* (2014.12)

(58) Field of Classification Search
CPC ........ B25J 9/0006; B25J 9/0016; B25J 9/106; B25J 9/126
See application file for complete search history.

(56) References Cited

U.S. PATENT DOCUMENTS

| | | | | |
|---|---|---|---|---|
| 10,821,614 | B2 * | 11/2020 | Smith | ...................... F16D 27/14 |
| 2022/0364621 | A1 * | 11/2022 | Moffitt, Jr. | .............. F16F 1/028 |

* cited by examiner

*Primary Examiner* — William C Joyce
(74) *Attorney, Agent, or Firm* — Thomas | Horstemeyer, LLP

(57) ABSTRACT

Parallel variable stiffness actuators are disclosed. The parallel variable stiffness actuator can comprise a spring and a variable-stiffness mechanism. The variable-stiffness mechanism can be configured to modulate a stiffness of the parallel variable stiffness actuator. The parallel variable stiffness actuator can further comprise a direct-drive motor arranged in parallel with the spring. A force of the direct-drive motor can be applied directly to a load. Resonant energy accumulation methods implemented by a parallel variable stiffness actuator are also disclosed. A stiffness of a spring can be changed when there is no energy stored by the spring. A resonant energy accumulation method where a force of a direct-drive motor can be applied in resonance with the oscillatory motion, while the stiffness of the parallel variable stiffness actuator can be changed to keep the amplitude of the oscillatory motion nearly constant.

10 Claims, 7 Drawing Sheets

METHOD AND APPARATUS FOR HUMAN AUGMENTATION AND ROBOT ACTUATION

CROSS-REFERENCE TO RELATED APPLICATIONS

This application claims the benefit of U.S. Provisional Application No. 63/225,156, filed Jul. 23, 2021, and entitled "AUGMENTED HUMAN MOTION", the entire contents of which are hereby incorporated herein by reference.

BACKGROUND

Compliant actuators have demonstrated potential in the areas of industrial robot safety, rehabilitation devices, and mobile robotics. One of the most common compliant actuators is the Series Elastic Actuator (SEA); in its most basic arrangement, the SEA is the addition of an elastic element (e.g., a spring) between the load and the primary actuator (e.g., a motor). The passive compliance of the spring functions to protect the primary actuator (typically highly geared) from shock loads, allow safe force control of the load, and store elastic potential energy. SEAs can be found in devices such as ankle prostheses knee prostheses and powered arm exoskeletons. One modification the SEA is the Variable Stiffness Actuator (VSA), in which a Variable Stiffness Spring (VSS) is used in place of a fixed-stiffness spring. The variable passive compliance allows for control of frequency response and actuation speed and has been used in ankle exoskeletons and robotic joints. However, series compliant actuators have a few pitfalls that limit their practicality in human augmentation and robotic devices: it is energetically expensive to generate force during motion, and all force generated by the motor must first pass through the spring, which limits the force control bandwidth of the actuator. Because of these limitations, SEAs and VSAs are not well suited for high-energy tasks.

For most actuators, there is a trade-off between torque density and compliance. Gears are typically used to increase the torque density of electric motors, but come with the cost of lower efficiency, reduced precision, and slower response times. Thus, it is desirable to minimize the gearing when possible. Recent developments of torque-tense motors have enabled the use of low gearing or even direct drive robotic joints. For example, the MIT Cheetah is a quadruped robot which runs using highly backdrivable motors. Direct-drive motors still have much lower torque density than comparable gearmotors. One way to amplify output torque of a motor without compromising efficiency or compliance is to use a mechanical spring in parallel with the motor, i.e., a Parallel Elastic Actuator (PEA). Parallel elasticity especially shows promise in assistive devices where the elastic element can offload or amplify force from the muscles; for example, a walking exoskeleton and a jogging exoskeleton utilized parallel elastic elements to reduce metabolic energy cost. One limitation for PEAs is the use of fixed stiffness springs; fixed stiffness springs only promote efficient cyclic motion at one resonant frequency and it is energetically expensive to oscillate at different frequencies.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

Figure 1:
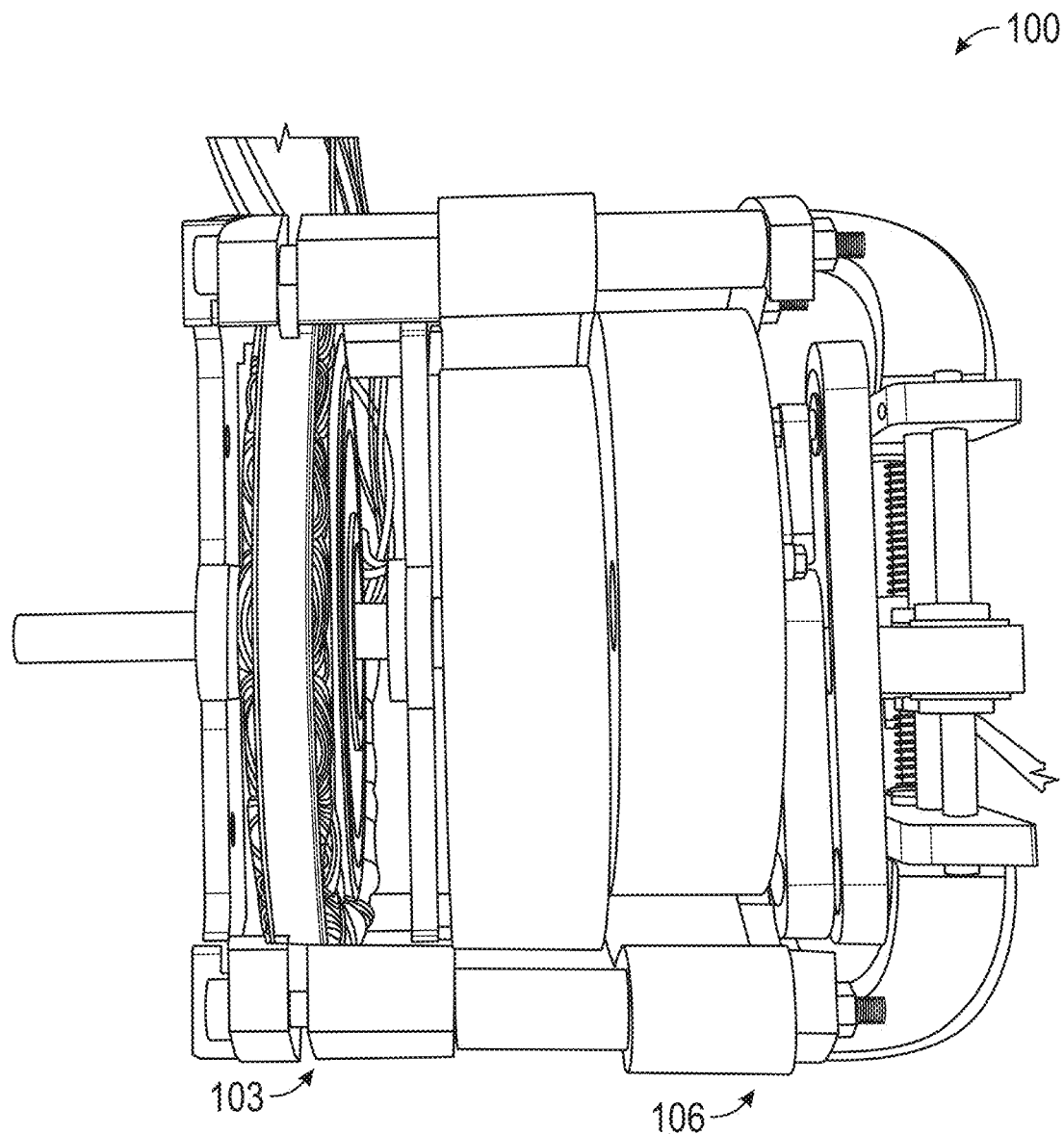
FIG. 1 shows an example of a parallel variable stiffness actuator (PVSA), according to various embodiments of the present disclosure.

The present disclosure relates to a parallel variable stiffness actuator (PVSA). The parallel variable stiffness actuator can be a compliant actuator comprising a variable stiffness spring placed in parallel with a direct-drive motor. The parallel variable stiffness actuator can inherit benefits of both direct-drive motors and variable stiffness springs. The parallel variable stiffness actuator can therefore provide high-fidelity force control and controllable energy storage. The parallel variable stiffness actuator can include a compact design using a flat motor connected to an adjustable mechanical advantage torsion spring.

The parallel variable stiffness actuator may not be subject to the fundamental force control bandwidth limitation of series elastic and variable stiffness actuators. In addition, the parallel variable stiffness actuator can enable resonant energy accumulation despite the limited deformation of the spring and the constrained motion of the load attached to the actuator. The latter advantage can differentiate the parallel variable stiffness actuator from fixed-stiffness parallel elastic actuators.

The parallel variable stiffness actuator can be used with smaller direct-drive motors to match the peak power of larger motors without compromising force control fidelity. The parallel variable stiffness actuator can be used to implement resonant forcing under joint angle limitations in walking, jumping, running, or swimming, using robotic exoskeletons to augment human motion in these tasks.

The parallel variable stiffness actuator can be used to implement resonant energy accumulation under limited motion in robots. The parallel variable stiffness actuator can be used to implement resonant energy accumulation under joint angle limitations, and limitations on the end-effector motion to increase the speed of industrial robots performing pick-and-place tasks.

One example of a model of a parallel variable stiffness actuator can include a larger direct-drive motor—a pure force generator—that can act on a load, a variable stiffness spring that can act on the load, and a stiffness-modulating mechanism that can be driven by a small motor. The equations that can govern the dynamics of the load and the stiffness modulating mechanism can be given by:

$$M\ddot{q} + k(x)q = F \quad (1)$$

$$m\ddot{x} + \frac{1}{2}\frac{dk(x)}{dx}q^2 = F_m \quad (2)$$

where M is the mass of the load, q is the position of the load, x is the position of the stiffness-modulating mechanism, F is the force of the direct drive motor acting on the load, m is the mass of the stiffness-modulating mechanism, and $F_m$ is the motor force used to change the stiffness of the parallel variable stiffness mechanism.

A relation between a stiffness of an actuator k and a position of the motor x that can modulate a stiffness of the spring can depend on the stiffness-modulating mechanism. For example, the following relations can define a stiffness of a stiffness modulator:

$$k(x) = c_0 + c_1 x, \quad k(x) = \frac{c_0}{x}, \quad k(x) = \frac{c_0}{x^3} \tag{3}$$

where $c_0$ and $c_1$ represent design parameters while x can be the length of a spring, a helical spring, a torsional leaf-spring, or a bending leaf-spring.

The parallel variable stiffness actuator 100 can accumulate energy in resonance while regulating a desired amplitude. The parallel variable stiffness actuator can be modular and compact such that it can be incorporated into a range of cyclic tasks. The parallel variable stiffness actuator can be tested in an experiment to demonstrate the feasibility of resonant energy accumulation under motion range limitations and realistic timing and damping conditions. In some implementations, the parallel variable stiffness actuator can be used in a novel hip-joint exoskeleton to increase swing leg frequency where the spring assistance torque is modulated as a function of the user's walking or running speed.

FIG. 1 shows an example of a parallel variable stiffness actuator (PVSA) 100. The parallel variable stiffness actuator 100 can include a direct-drive motor 103 arranged in parallel with a variable stiffness spring 106. The parallel variable stiffness actuator 100 can provide high-fidelity force control and controllable energy storage with inherent compliance. Benefits of the parallel variable stiffness actuator 100 can include, for example, high-fidelity force control compared to series elastic actuators and resonant forcing under motion constraint compared to parallel elastic actuators.

For cyclic motions, the parallel variable stiffness actuator 100 can amplify the mechanical power of the direct-drive motor 103 by using the variable stiffness spring 106 as a mechanical energy storage reservoir. The variable stiffness spring 106 can modulate the resonant frequency of the system. This can provide both power amplification and frequency modulation, instead of amplitude modulation to accumulate energy. Frequency modulation can enable kinetic energy accumulation under motion constraints, such as energy accumulation by repeated jumping, for example.

The parallel variable stiffness actuator 100 can have a high motor power to weight ratio, a high energy storage to weight ratio, and a large range of stiffness change. The parallel variable stiffness actuator 100 can include a modular architecture. In this modular architecture, the variable stiffness spring 106 can be connected to the direct-drive motor 103 in a similar manner to how a gearbox is connected to a motor, and springs with different energy storage capacity and stiffness can be interchanged similar to gearboxes with different gear ratios.

Figure 2A:
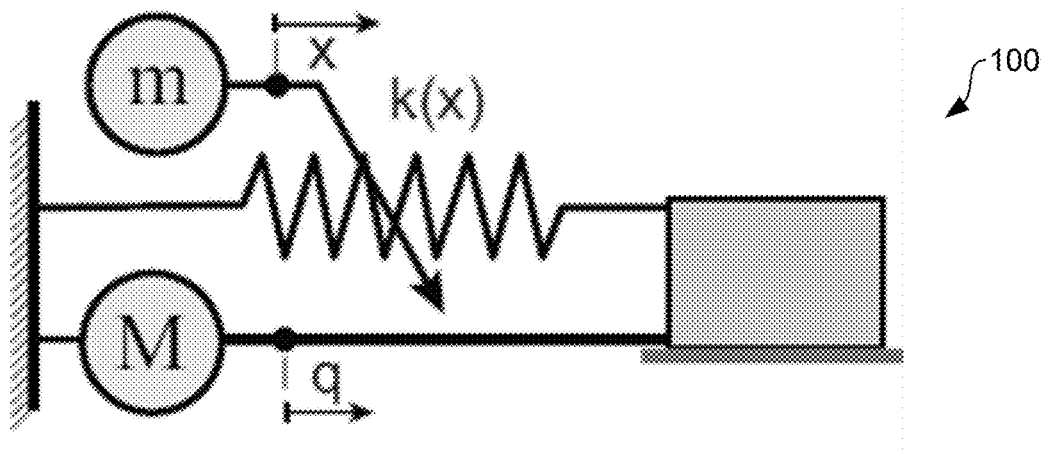
FIGS. 2A-C show examples of compliant actuators, according to various embodiments of the present disclosure.
Figure 2B:
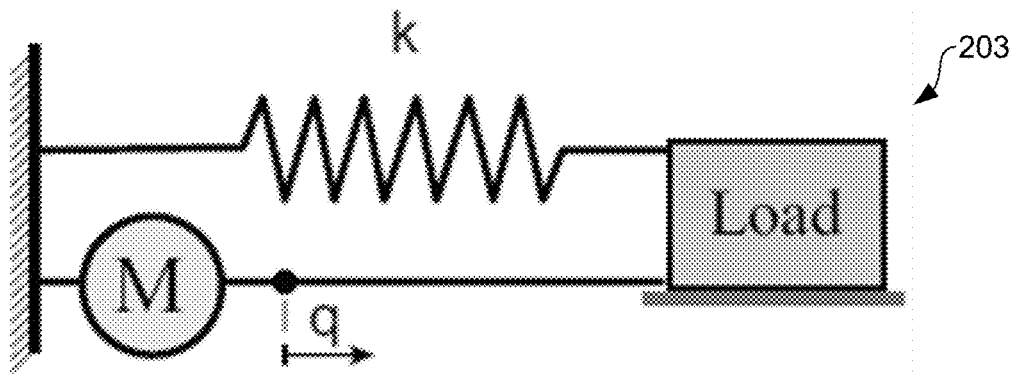
Figure 2C:
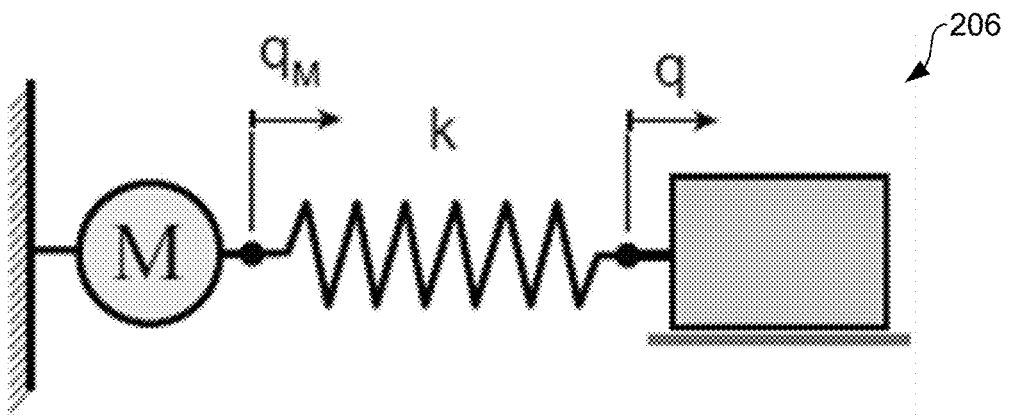

FIGS. 2A-C show examples of compliant actuators. FIG. 2A illustrates an example of the parallel variable stiffness actuator 100, FIG. 2B illustrates an example of a parallel elastic actuator 206, and FIG. 2C illustrates an example of a series elastic actuator 209. In the examples of FIGS. 2A-C, the compliant actuators can be driven by a large motor that can generate force and supply energy. The compliant actuators can further be driven by a small motor that can modulate a stiffness of their respective springs. q can denote the position of the load, x can be the position of the small motor, and $q_M$ can be the position of the motor in for the series elastic actuator of FIG. 2C.

A force of the driving motor F can be directly applied to a load. Consequently, the force control bandwidth of the parallel variable stiffness actuator may only be dependent on the time constant of the motor current dynamics while it is independent of the time constant of the motor position dynamics. The same may not apply to series elastic actuators 209 or the more general class of variable stiffness actuators (not shown). In both of these actuators, the motor force may not be applicable directly to the load and may only be applicable through the spring. As a result, the force control bandwidth in the series elastic actuator of 209 and variable stiffness actuators in general can be determined by a time constant of the motor position dynamics, which may be, for instance, three orders of magnitude larger (fraction of a second) than the time constant of the motor current dynamics (fraction of a millisecond).

Consider an example in which oscillatory motion of a robot limb is generated, similar to the oscillatory motion of the hip in human running or swimming. In this task, it may be assumed that the oscillations start with low frequency—corresponding to jogging or casual swimming—and end at a high frequency, as in sprinting. Also, in this example, the task can be performed using a weak, force limited actuator, similar to a force limited muscle. It can be ensured that the amplitude of the oscillatory motion does not exceed a set constraint, which may be interpreted as a motion range or joint angle limitation in robots or humans.

Resonant forcing can be a useful method of actuation using a fast but weak actuator. These are characteristics of a direct-drive motor. Here, we assume that bandwidth of the ideal motor is infinite while the motor can only produce limited force:

$$F \in [-F_{max}, F_{max}] \tag{4}$$

Resonant forcing can also require a spring with sufficient energy storage capacity. The energy storage capacity of a linear spring can be defined by its stiffness and the maximum allowable deflection of the spring $E \leq E_{max} = \frac{1}{2} k q_{max}^2$. Here, it may be assumed that the stiffness of the spring can be changed in a finite range and that the deflection of the spring can be limited $$k \in [k_{min}, k_{max}] \text{ and } q \in [-q_{max}, q_{max}]. \tag{5}$$

In resonant forcing, the motor force $F = \pm F_{max}$ can be applied as a constant, where the direction of the force can change at every peak of the load position q (see FIG. 2A). In this way, the amplitude can grow without bound (assuming no energy dissipation). Thus, the constraints on the load position $q(t) \in [-q_{max}, q_{max}]$ may not be maintained at all times t. However, the amplitude of the oscillator may be limited to ensure that $q \in [-q_{max}, q_{max}]$ can be maintained at every cycle by changing the stiffness of the spring when it does not store energy $q \approx 0$. The energy balance of the system can show the relation between stiffness $k_n$, external force $F_n$, and the maximum amplitude of oscillations $q_{max}$:

$$E_{n+1} = E_n + 2F_n q_{max} \Rightarrow \frac{1}{2} k_{n+1} q_{max}^2 = \frac{1}{2} k_n q_{max}^2 + 2F_n q_{max}. \tag{6}$$

From Equation (7), a relationship between amplitude, resonant forcing, and stiffness can be established:

$$k_{n+1} = k_n + \frac{4F_n}{q_{max}} \quad (7)$$

where n and n+1 can denote the current and the next half oscillatory cycles. Assuming $k_0=k_{min}$ and $k_n<k_{n+1}$, the frequency of the oscillations can increase according to the following relation:

$$f_n = \frac{1}{\pi\sqrt{m}} \left( \frac{1}{\sqrt{k_n}} + \frac{1}{\sqrt{k_n + \frac{4F_n}{q_{max}}}} \right)^{-1}. \quad (8)$$

Therefore, by changing the stiffness of the spring $k_{min}<k_1< \ldots <k_n< \ldots <k_N \leq k_{max}$, a desired frequency $f_d$ may be reached in finitely many oscillations N, and maintain the desired frequency using zero force and the optimal stiffness:

$$f_d = f_N, \quad F_N = 0, \quad k_N = \frac{4}{\pi^2 m} \frac{1}{f_d^2} \leq k_{max}. \quad (9)$$

Increasing the frequency of the oscillations while the amplitude is maintained constant (6) can lead to energy accumulation $E_{min} \leq E_0 < E_1 < \ldots < E_n < \ldots < E_N \leq E_{max}$. Maintaining the constant amplitude condition (6) is possible if the minimum amount of energy exceeds a lower limit $E_0 \geq \frac{1}{2} k_{min} q_{max}^2$ while the maximum amount of energy does not exceed the energy capacity of the spring.

$$E_N \leq \frac{1}{2} k_{max} q_{max}^2. \quad (10)$$

Thus, constant amplitude resonant forcing can be achieved by a parallel variable stiffness actuator 100 by assuming a simplest linear spring and no energy dissipation. This principle can extend to weakly dissipative nonlinear oscillators. This principle may also be useful to accumulate energy—increase a frequency of an oscillatory limb motion subject to joint angle limitation—in robots driven by a parallel variable stiffness actuator that embodies a small direct-drive motor.

Figure 3A:
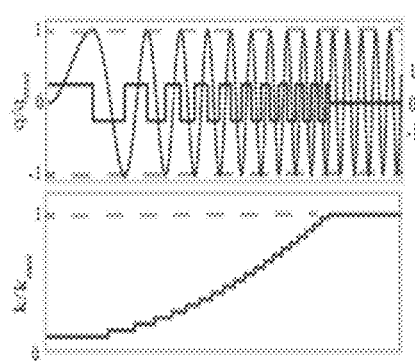
FIGS. 3A-C show examples of resonant forcing of a linear oscillator, according to various embodiments of the present disclosure.
Figure 3B:
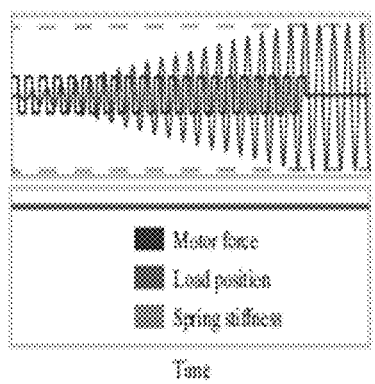
Figure 3C:
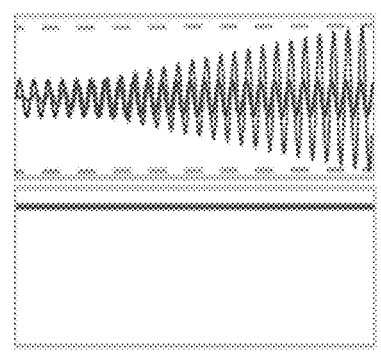

FIGS. 3A-C show examples of resonant forcing of a linear oscillator: in FIG. 3A using a parallel variable stiffness actuator 100, in FIG. 3B using a parallel elastic actuator 206, and in FIG. 3C using a series elastic actuator 209. To compare the parallel variable stiffness actuator 100 with parallel elastic actuators and series elastic actuators, it may be assumed that all three of these actuators have a same energy storage capacity and maximum motor force. The actuators 100, 206, 209 can be assumed to have instantaneous force generation and stiffness modulation. In the series elastic actuator 209, the force generation can be filtered through general closed loop positioning dynamics of the motor.

Compared to the parallel variable stiffness actuator 100, the ability of the series elastic actuator 209 to accumulate energy can be tied to a closed loop position control bandwidth of the motor. The series elastic actuator 209 can use a highly geared motor drive with position control to create a positional differential between the load and the motor. The maximum work done by the series elastic actuator 209 can depend on its position control bandwidth, which may be three orders of magnitude lower than the force control bandwidth of the motor. Because of this, the series elastic actuator 209 can take more cycles that the parallel variable stiffness actuator 100 to accumulate a same amount of energy, as shown in FIG. 3C.

Compared to the parallel variable stiffness actuator 100, the parallel elastic actuator 206 can do less work in every cycle and therefore needs more cycles to accumulate a same amount of energy, as shown in FIG. 3B. The maximum work done by the parallel elastic actuator 206 can be $F_{max} q_{max}$, $n \leq F_{max} q_{max}$ where the amplitude can increase only gradually according to $$q_{max,n+1} = q_{max,n} + \frac{F_{max}}{k_{max}} \leq q_{max}. \quad (11)$$

Because of this, the parallel elastic actuator 206 can take more cycles than the parallel variable stiffness actuator 100 to accumulate a same amount of energy, as shown in FIGS. 3A and 3B.

The parallel elastic actuator's 206 higher number of cycles could be detrimental for tasks with collision and hysteretic energy losses. Depending on the system natural frequency, the ability of the motor to apply force may be attenuated as well since the system is always operating at the spring resonant frequency.

FIGS. 4A-D show examples of a parallel variable stiffness actuator 100. The parallel variable stiffness actuator 100 can comprise a variable stiffness mechanism 403, a spring 406, and a direct-drive motor 409. The parallel variable stiffness actuator 100 can be designed to, for example: maximize an energy storage capacity of the parallel variable stiffness actuator 100; minimize energy losses of the parallel variable stiffness actuator 100; maximize volumetric efficiency parallel of the parallel variable stiffness actuator 100; include a modular design, such that the spring 406 can easily be interchanged to fit system requirements. The mechanical design of the parallel variable stiffness actuator 100 can satisfy these design goals for example: using torsion spiral springs 406; using a self-locking stiffness modulator 412; having little unused space with the volume of the parallel variable stiffness actuator 100; and allowing easy swapping of the spring 406, direct-drive motor 409, and stiffness modulator 412 depending on a particular task.

The spring 406 can comprise any torsion spring form factor because the variable stiffness mechanism can include an adjustable mechanical-advantage design. Design goals of the spring 406 can include, for example, maximizing energy storage per volume, demonstrating low hysteresis, and being easily manufacturable. As one example, a spiral torsion spring 406 may be used because these springs demonstrate large volumetric energy storage densities as a long length of spring 406 can be coiled in a compact manner. The base torsional stiffness $k_{spring}$ can be modeled as:

$$k_{spring} = \frac{Ebh^3}{12L} \quad (12)$$

where E can be Young's modulus, b can be a width of the spring 406, h can be a thickness of the spring 406, and L can be an effective length of the spring 406.

The spring 406 can operate in the elastic regime for small deflections. If spirals of the spring 406 are spaced far enough at this deflection, the spring 406 can also avoid colliding with itself, which can cause nonlinear stiffness effects and reduced efficiency. Flat spiral springs may not have the same properties in counterclockwise rotation as in clockwise rotation, but one way to account for this can include de-clutching the springs during extension. However, this can result in a lower energy density since one spring may be disengaged at all times. Another way can include mounting two springs in opposite configurations such that one spring is in extension and one spring is in compression. In this setup, the stiffness can average out for both directions.

Another advantage of using spiral torsion springs as the spring 406 is the ease of manufacturing. The flat design is ideal for 3D printed, rolled, or cast materials. With the development of continuous fiber fabrication (CFF), strands of fiberglass can be laid along the length of the spiral spring. Continuous fiberglass can be used to fabricate the springs 406 shown in FIGS. 4A-B, as an example. 3D printed continuous fibers, as another example, can demonstrate similar mechanical properties to 6061 Aluminum alloys with the design freedom of 3D printing.

The direct-drive motor 409 can be selected based on geometry and power requirements. Generally, the torque capability of a motor is proportional to its diameter. The functionality of the direct-drive motor 409 in the parallel variable stiffness actuator 100 can include, for example: the direct-drive motor 409 that can generate enough torque to overcome system damping; and the direct-drive motor 409 that can apply torque to change stiffness $k_{n+1}-k_n \propto F_n$ according to Equation (8). Therefore, the minimum motor torque in the parallel variable stiffness actuator 100 can be defined by system damping, while the maximum motor torque can define the transient time required for the system to reach the desired oscillation frequency. Unlike in a direct drive actuator, the motor torque may not define the maximum torque of the parallel variable stiffness actuator 100.

The direct-drive motor 409 can comprise, for example, an Allied Motion MF0127008 brushless frameless motor (shown in FIGS. 4A-B), which can have a continuous torque rating of 1.6 Nm and a motor constant of 0.296 Nm/A. A housing of the direct-drive motor 409 can support both the stator of the direct-drive motor 409 and the springs 406. The springs 406 and stiffness modulator 412 were attached to the back of a shaft of the direct-drive motor 409, while the output of parallel variable stiffness actuator 100 is at the front of the shaft. An AMS AS5304A offset-axis magnetic encoder and axial magnet can be placed inside of a rotor of the direct-drive motor 409 for precise position measurements.

The variable stiffness mechanism 403 can be based on an adjustable mechanical advantage design. For example, a design using a variable pivot point can be used that can keep energy storage of the variable stiffness mechanism 403 independent of its stiffness. This is not true for variable stiffness springs where the effective length of the spring is changed to modulate stiffness. If the pivot point drive train passively locks, then the variable stiffness spring can maintain a certain stiffness passively.

Assuming small-angle deflections, the stiffness of the variable pivot point spring 406 can be represented with the following equation:

$$k(x) = k_{spring}\left(\frac{x}{l-x}\right)^2 \quad (13)$$

where $k_{spring}$ can be a stiffness of the variable pivot point spring 406, x can be the position of the variable pivot point spring 406 along a lever arm 418, and l can be a length of the lever arm 418. According to this equation, a large range of stiffness can be achievable. Theoretically, the range of achievable stiffness can be [0, ∞) (if the pivot point is placed at the ends of the lever arm 418). Practically, the range of achievable stiffness will depend on how close the pivot point can be moved to the ends of the lever arm.

The equation of motion for a stiffness modulator 412 (see Equation (2)) can be the following:

$$m\ddot{x} + k_{spring}l\frac{x}{(l-x)^3}q^2 = F_m \quad (14)$$

This equation can show that when the deflection of the variable pivot point spring 406 is zero q=0 (when the variable pivot point spring 406 does not store energy), the stiffness modulator 412 can change the stiffness of the spring without working against the variable pivot point spring 406. If the stiffness modulator 412 is self locking, such as with a lead-screw, the force to maintain position by the stiffness modulating 412 $F_m$ can be zero. Because of these two features, a small and lightweight motor can be used to drive the variable stiffness mechanism 403. Because the stiffness modulator 412 can be operated at a small range around zero deflection, ±Δq, the stiffness modulator 412 be fast enough to increment position within this range. Given a maximum load frequency $\omega_{max}$ and amplitude $q_{max}$, the desired positioning time Δt (the time it takes to increment stiffness $k_n$ to $k_{n+1}$) satisfies $\Delta t < 2\Delta q/(q_{max}\omega_{max})$.

Figure 4A:
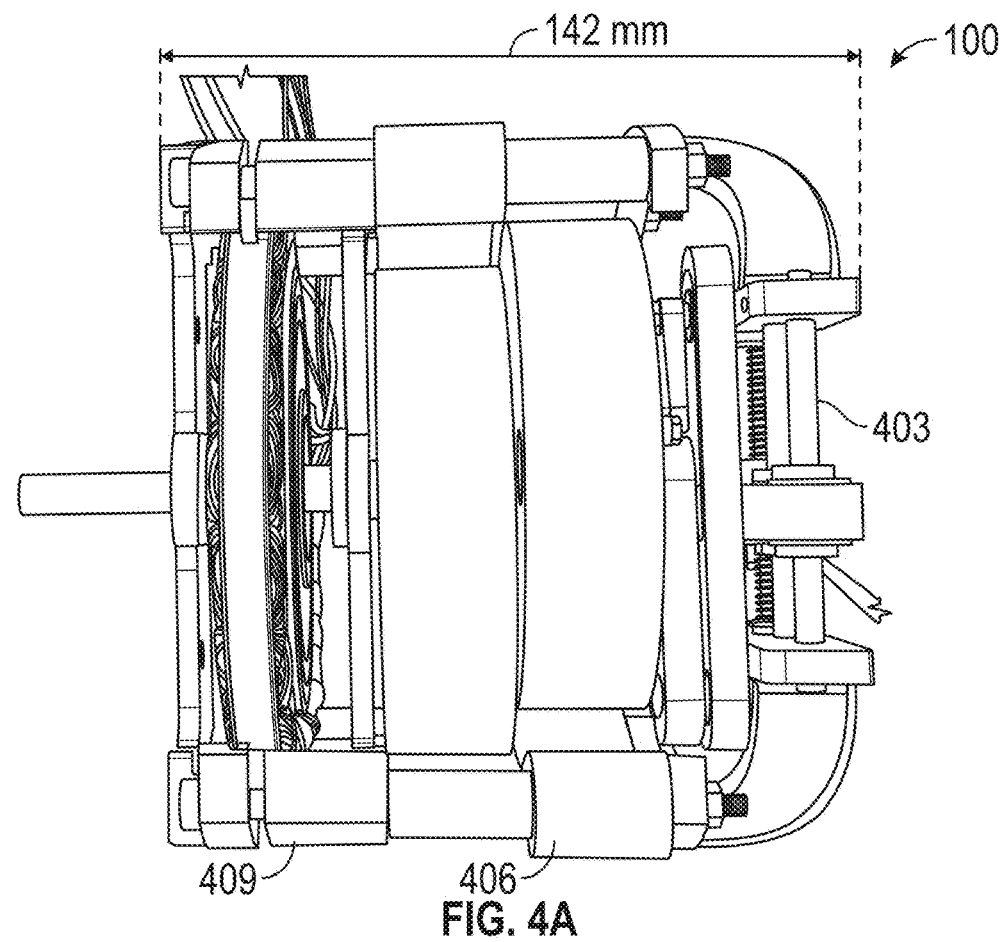
FIGS. 4A-D show examples of a parallel variable stiffness actuator, according to various embodiments of the present disclosure.
Figure 4B:
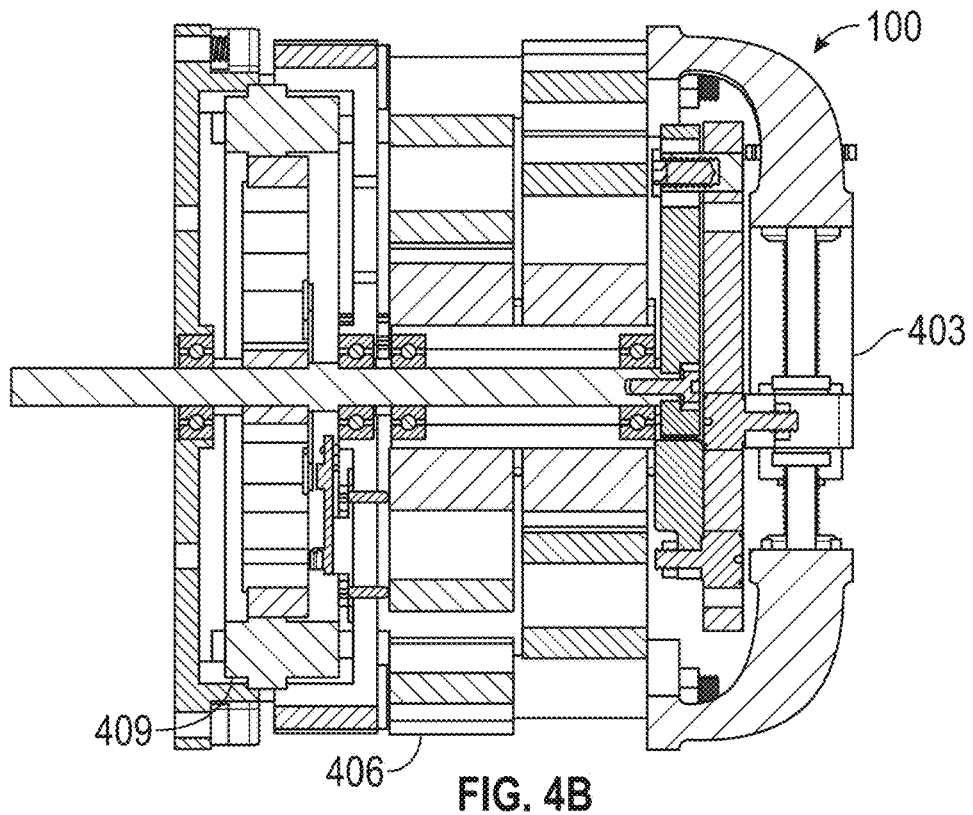
Figure 4C:
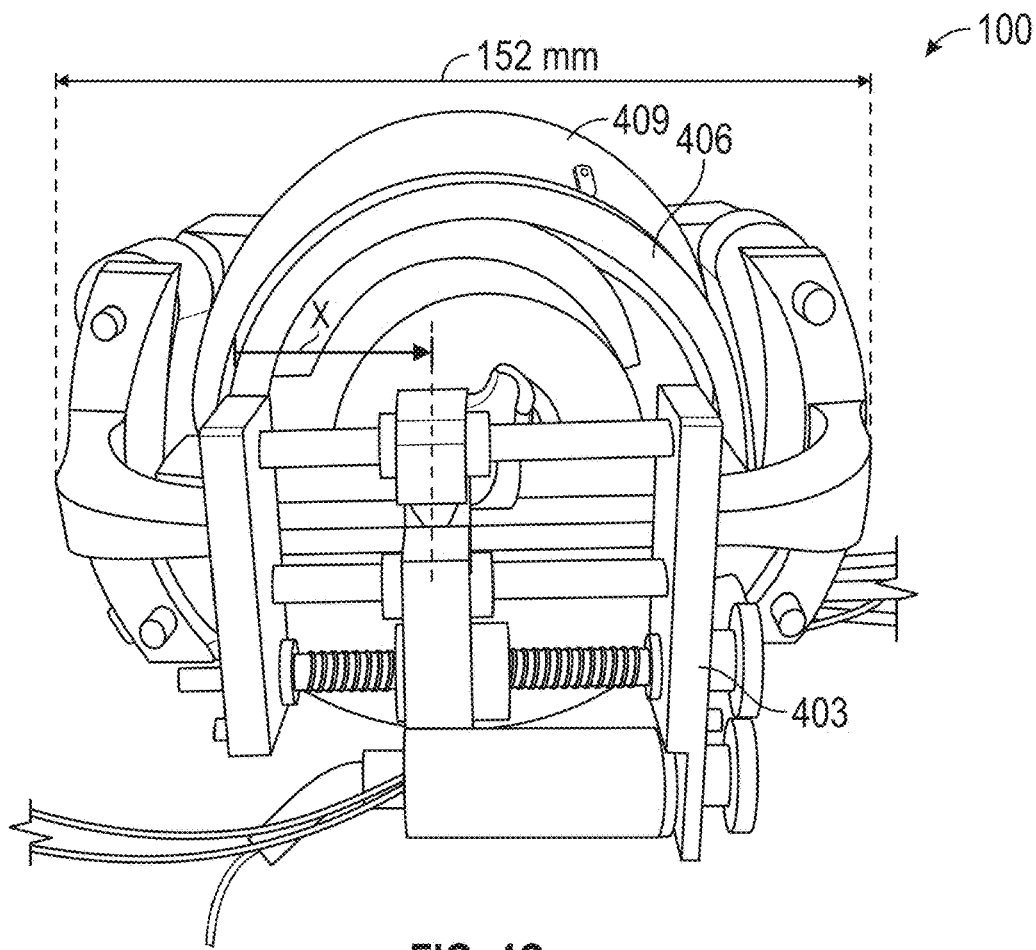
Figure 4D:
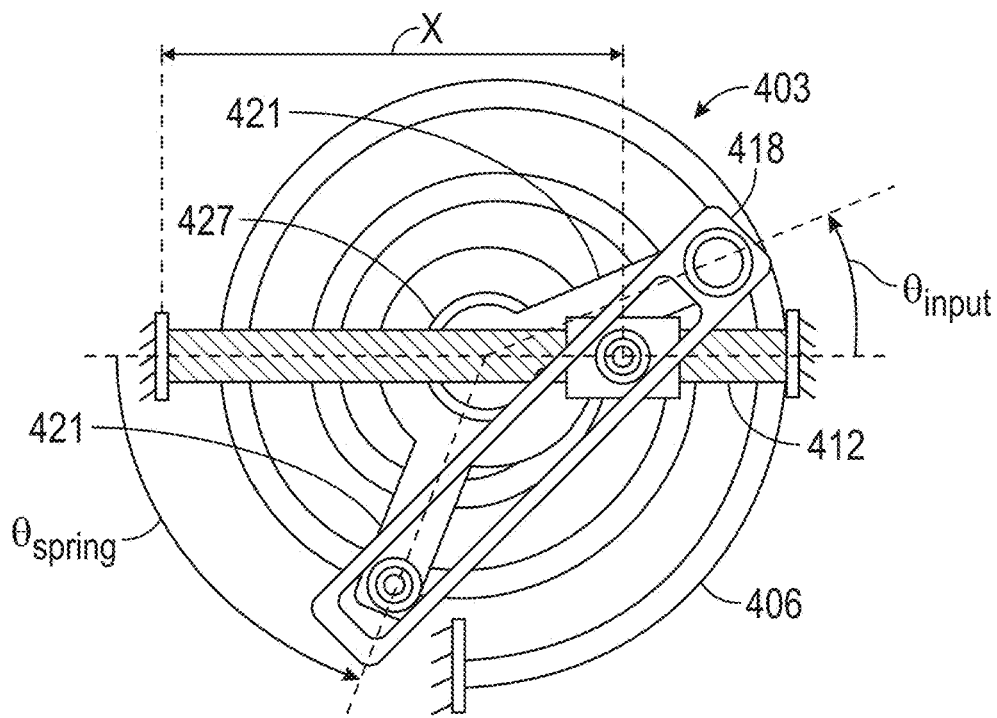

To convert the lever arm 418 mechanism from a linear displacement mechanism to an angular displacement mechanism, two linkages 421 can be added at each end to relate input angle to the spring deflection angle as depicted in FIG. 4D. Since the linkage 421 at each end of the lever arm 418 can both connect back to a same axis of rotation, the center of the spring 406 can be mounted about an arbor on a main shaft 427. This arrangement can also allow the linkages 421 to fit into a cylindrical footprint.

A lead screw drive can be used as a pivot positioning actuator since it may be self-locking. A direct driven Maxon DCX-22L motor or other suitable motor can be used for the lead screw modulator. The range of mechanical advantage adjustment of this spring can be found through a geometric analysis of the linkages 421. In the specific mechanism design as shown in FIG. 4D, the range of mechanical advantage achieved was [0.39,2.8].

FIGS. 5A-E show the setup and results of an experiment involving the parallel variable stiffness actuator. The analytical investigation within the discussion of FIGS. 4A-D was based on several assumptions, such as instantaneous force generation of the motor, instantaneous stiffness change, and zero damping. In the discussion of FIGS. 5A-E, the performance of the parallel variable stiffness actuator 100 is investigated using an experiment that is not subject to the aforementioned assumptions. In the experiment, a pendulum 503 (0.4 m long and 2 kg) was attached to the parallel variable stiffness actuator 100 and the parallel variable stiffness actuator 100 was used to speed up the oscillation of the pendulum 503 from its natural frequency of 0.9 Hz to a desired frequency of 2 Hz while maintaining an amplitude of ±30 deg. This experiment was used to emulate the speeding up of leg swing from walking and running with different swing frequency of the legs (from 0.9 Hz to 2 Hz) but the same step length (±30 deg).

A controller was implemented to switch the direction of the direct-drive motor's 409 torque based on the motion of the pendulum 503, such that applies torque in resonance with the motion of the pendulum 503. The stiffness modulator was set to increment stiffness within a range of ±5 deg and used a PD controller to regulate the position of the pivot point, as in FIGS. 4C-D.

Figure 5A:
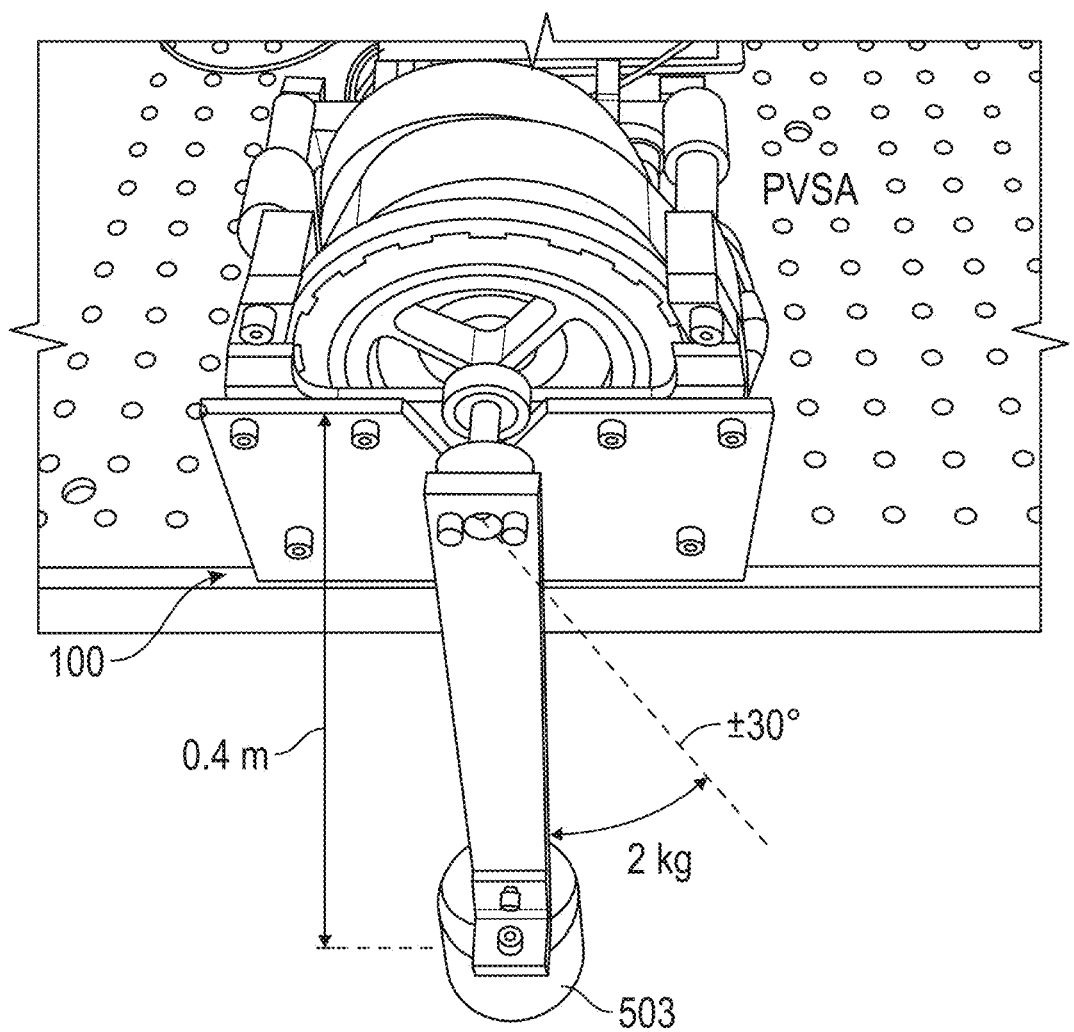
FIGS. 5A-E show the setup and results of an experiment involving the parallel variable stiffness actuator, according to various embodiments of the present disclosure.
Figure 5B:
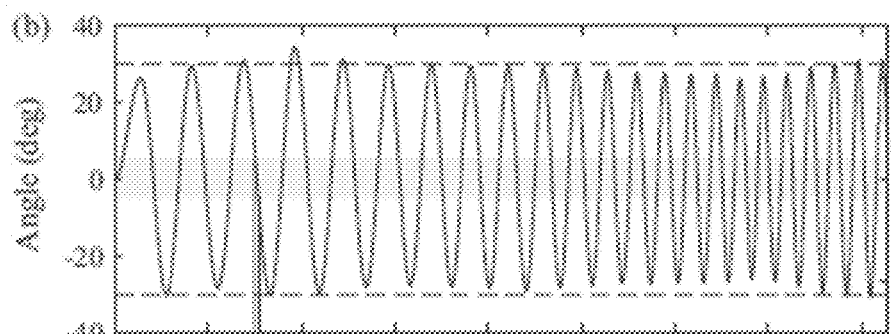
Figure 5C:
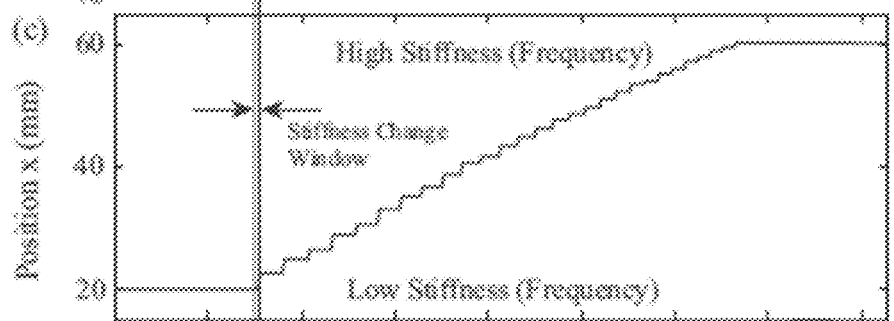
Figure 5D:
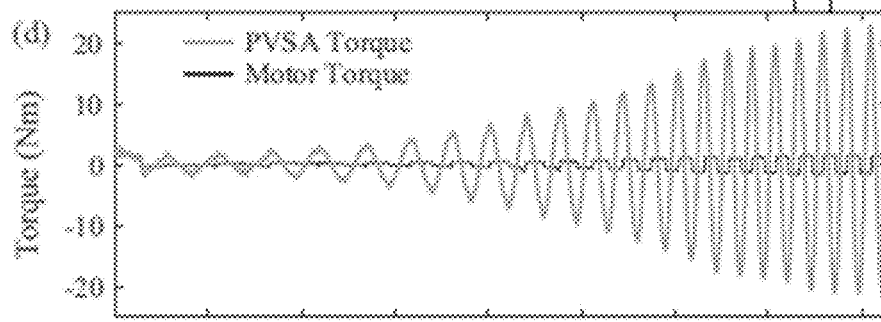

FIG. 5A shows the experimental setup of the parallel variable stiffness actuator 100. FIG. 5B shows the angle of the pendulum 503. FIG. 5C shows a position of the pivot point in the stiffness modulating subsystem x during an exemplary trial. FIG. 5D shows an example of results for actuator torque and input drive motor torque during an exemplary trial.

The input drive motor torque was calculated by multiplying the instantaneous drawn motor current by the torque constant. The actuator torque was estimated by separating out the gravitational torque contribution of the pendulum 503 $\tau_{PVSA} \approx ml^2\ddot{\theta} + mgl \sin \theta$, where m can be a mass of the pendulum 503 and l can be a distance from the shaft to the center of the weight, as shown in FIG. 5A. The electrical power consumption was calculated by multiplying the consumed current by the motor voltage.

Figure 5E:
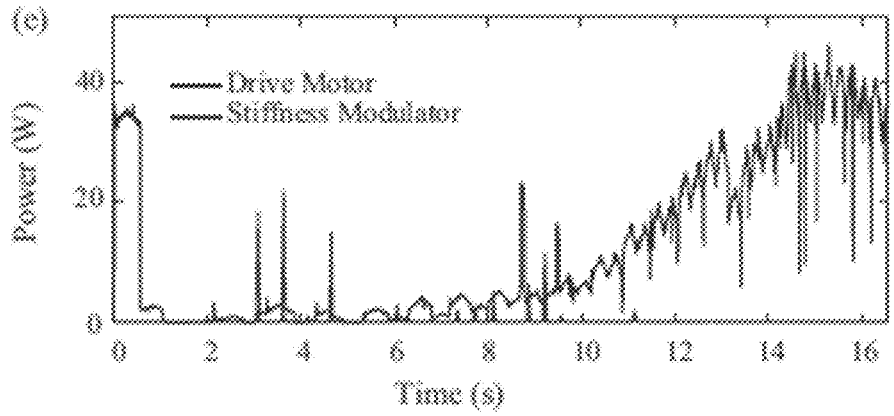

FIG. 5 shows that the parallel variable stiffness actuator 100 can, for example, accumulate energy within a set motion range limitation by increasing the frequency of the oscillations with negligible energy cost from the stiffness modulator (FIGS. 5B,C,E), amplify the torque produced by the actuator 15 times within 16 s (FIG. 5D), and maintain fast oscillations with a steady state power consumption of 37 W (FIG. 5E). This power can be used to compensate for the hysteretic energy losses and motor inefficiency.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A parallel variable stiffness actuator, comprising:
   a spring;
   a variable-stiffness mechanism configured to modulate a stiffness of the parallel variable stiffness actuator, wherein the variable-stiffness mechanism comprises a lever arm coupled to a spring, wherein the variable-stiffness mechanism further comprises a first linkage connected to a first end of the lever arm and a second linkage connected to a second end of the lever arm, the first linkage and the second linkage connecting to a same axis of rotation; and
   a direct-drive motor arranged in parallel with the spring, a force of the direct-drive motor being applied directly to a load.

2. The parallel variable stiffness actuator of claim 1, wherein the direct-drive motor comprises a brushless frameless motor.

3. The parallel variable stiffness actuator of claim 1, wherein the variable-stiffness mechanism modulates the stiffness of the parallel variable stiffness actuator without being opposed by the force of the spring when the spring is un-deflected.

4. The parallel variable stiffness actuator of claim 1, wherein the direct-drive motor comprises a housing and a stator, the housing supporting the spring and the stator.

5. The parallel variable stiffness actuator of claim 4, wherein the spring comprises a 3D printed spring.

6. The parallel variable stiffness actuator of claim 1, wherein the spring is mounted about an arbor on a shaft of the direct-drive motor.

7. The parallel variable stiffness actuator of claim 1, wherein the spring comprises a spiral torsion spring.

8. The parallel variable stiffness actuator of claim 1, further comprising a stiffness modulator that comprises a motor configured to manipulate a self-locking mechanism.

9. The parallel variable stiffness actuator of claim 8, wherein the spring and the stiffness modulator mechanism are coupled to a back of a shaft of the direct-drive motor, and an output of the parallel variable stiffness actuator is at a front of the shaft.

10. The parallel variable stiffness actuator of claim 1, wherein the variable-stiffness mechanism, the direct-drive motor, and the spring are arranged into a cylindrical form factor.

* * * * *